(12) United States Patent
Watanabe et al.

(10) Patent No.: US 8,806,875 B2
(45) Date of Patent: Aug. 19, 2014

(54) THERMOACOUSTIC DEVICE WITH SUPPRESSOR

(75) Inventors: Yoshiaki Watanabe, Kyoto (JP); Shinichi Sakamoto, Osaka (JP)

(73) Assignee: The Doshisha, Kyoto-shi (JP)

( * ) Notice: Subject to any disclaimer, the term of this patent is extended or adjusted under 35 U.S.C. 154(b) by 1594 days.

(21) Appl. No.: 11/662,253

(22) PCT Filed: Apr. 22, 2005

(86) PCT No.: PCT/JP2005/007686
§ 371 (c)(1),
(2), (4) Date: Mar. 9, 2007

(87) PCT Pub. No.: WO2006/073007
PCT Pub. Date: Jul. 13, 2006

(65) Prior Publication Data
US 2008/0060364 A1 Mar. 13, 2008

(30) Foreign Application Priority Data
Jan. 7, 2005 (JP) .................................. 2005-002625

(51) Int. Cl.
*F25B 9/00* (2006.01)
*F25B 9/14* (2006.01)

(52) U.S. Cl.
CPC ............ *F25B 9/145* (2013.01); *F02G 2243/54* (2013.01); *F02G 2243/52* (2013.01); *F25B 2309/1402* (2013.01); *F25B 2309/1403* (2013.01); *F25B 2309/1404* (2013.01); *F25B 2309/1405* (2013.01); *F25B 2309/1416* (2013.01)
USPC ............................................................. 62/6

(58) Field of Classification Search
CPC ..... F25B 9/145; F25B 2309/1402–2309/1405; F02G 2243/52; F02G 2243/54
USPC ........................................... 62/6; 60/516–526
See application file for complete search history.

(56) References Cited

U.S. PATENT DOCUMENTS 4,114,380 A * 9/1978 Ceperley ......................... 60/721
4,355,517 A * 10/1982 Ceperley ......................... 60/721
(Continued)

FOREIGN PATENT DOCUMENTS

| JP | 8-128743 A | 5/1996 |
| JP | 2000-088378 A | 3/2000 |

(Continued)

OTHER PUBLICATIONS

English translation of JP 2000-088378.*

(Continued)

*Primary Examiner* — John F Pettitt
(74) *Attorney, Agent, or Firm* — Westerman, Hattori, Daniels & Adrian, LLP

(57) ABSTRACT

There is provided a thermoacoustic device 1 which has in a loop tube 2, a first stack 3a between a first high-temperature side heat exchanger 4 and a first low-temperature side heat exchanger 5, and a second stack 3b provided between a second high-temperature side heat exchanger 6 and a second low-temperature side heat exchanger 7, so that heat at the first stack side is prevented from being transported to the second stack side even when a large acoustic wave is generated in the tube. In the device, self-excited standing and traveling waves are generated by heating the first high-temperature side heat exchanger 4, and by the standing and traveling waves, the second low-temperature side heat exchanger 7 is cooled. a piezoelectric film 81 is provided to suppress an acoustic streaming and/or a direct-current type flow of a working fluid.

2 Claims, 8 Drawing Sheets

(56) References Cited

U.S. PATENT DOCUMENTS

| | | | |
|---|---|---|---|
| 6,032,464 A | | 3/2000 | Swift et al. |
| 7,404,296 B2 * | | 7/2008 | Watanabe et al. .................. 62/6 |
| 2006/0119224 A1 * | | 6/2006 | Keolian et al. ................ 310/339 |

FOREIGN PATENT DOCUMENTS

| JP | 2002-31423 A | 1/2002 |
|---|---|---|
| JP | 2002-535597 A | 10/2002 |
| WO | WO 00/43639 A1 | 7/2000 |
| WO | WO 2004085934 A1 * | 10/2004 |

OTHER PUBLICATIONS

International Search Report of PCT/JP2005/007686, date of mailing Jul. 19, 2005.

* cited by examiner

THERMOACOUSTIC DEVICE WITH SUPPRESSOR

TECHNICAL FIELD

The present invention relates to a thermoacoustic device capable of cooling an object to be cooled using a thermoacoustic effect, and more particularly, relates to a thermoacoustic device capable of improving conversion efficiency from acoustic energy to thermal energy.

BACKGROUND ART

Heat exchange devices using an acoustic effect have been disclosed, for example, in the following Patent Document 1 and Non-Patent Document 1.

The device disclosed in Patent Document 1 relates to a device which performs cooling using a thermoacoustic effect, in which a first stack provided between a high-temperature side heat exchanger and a low-temperature side heat exchanger, and a regenerator (second stack) provided between a high-temperature side heat exchanger and a low-temperature side heat exchanger are provided inside a loop tube which seals helium, argon, or a mixture thereof therein, and in which by self-excited standing and traveling waves, which are generated by heating the high-temperature side heat exchanger at the first stack side, the low-temperature side heat exchanger at the regenerator side is cooled.

In addition, as is the case described above, an experimental study of a cooling device using a thermoacoustic effect has been disclosed in Non-Patent Document 1. The cooling device used in this experiment is also formed of a loop tube in which helium, argon, or a mixture thereof is sealed, a first stack provided between a heater (high-temperature side heat exchanger) and a low-temperature side heat exchanger, and a second stack provided at a position facing the first stack. The heater (high-temperature side heat exchanger) provided at the first stack side is heated while tap water is circulated in the low-temperature side heat exchanger so that temperature gradient is generated in the first stack, and a self-excited acoustic wave is generated in a direction opposite to this temperature gradient. Subsequently, the acoustic energy is transported to a regenerator side via the loop tube, and based on the energy conservation law, thermal energy is transported in a direction opposite to the acoustic energy at the second stack side, so that the vicinity of a thermometer provided at the other end side of the second stack is cooled. According to this document, it has been confirmed that under predetermined conditions, the temperature of a part at which the thermometer is provided is decreased by approximately 16° C.

[Patent Document 1] Japanese Unexamined Patent Application Publication No. 2000-88378

[Non-Patent Document 1] "Experimental Study on Acoustic Cooling Phenomenon Using Thermoacoustic Effect", Technical Report of IEICE, US2002-118 (2003-02), authored by Shinichi Sakamoto, Kazuhiro Murakami, and Yoshiaki Watanabe, and published by the Institute of Electronics, Information and Communication Engineers.

DISCLOSURE OF INVENTION

Problems to be Solved by the Invention

In order to enhance a cooling effect in a thermoacoustic device as described above, acoustic energy based on standing and traveling waves must be increases.

However, when large standing and traveling waves are generated in a loop tube, an acoustic streaming and/or a direct-current type flow, such as convention, of a working fluid is generated in the loop tube, and the working fluid sealed in the loop tube is forced to flow in one direction. As a result, along this flow, heat at a temperature of approximately 600° C., which is obtained by heating in a first high-temperature side heat exchanger provided at a first stack side, is transported to a second stack side, and besides a second high-temperature side heat exchanger which is set to a temperature of 15 to 16° C., a second low-temperature side heat exchanger, which is located at an output side at which cold heat is output, is also heated, resulting in degradation in heat exchange efficiency.

Accordingly, the present invention has been conceived in consideration of the above problems, and an object of the present invention is to provide a thermoacoustic device in which the heat exchange efficiency is improved by preventing heat at the first stack side from being transported to the second stack side even when a large acoustic wave is generated in the tube.

Means for Solving the Problems

In order to achieve the above object, the present invention provides a thermoacoustic device which has in a tube: a first stack provided between a first high-temperature side heat exchanger and a first low-temperature side heat exchanger; and a second stack provided between a second high-temperature side heat exchanger and a second low-temperature side heat exchanger, in which self-excited standing and traveling waves are generated by heating the first high-temperature side heat exchanger, and the second low-temperature side heat exchanger is cooled by the standing and traveling waves, or in which standing and traveling waves are generated by cooling the first low-temperature side heat exchanger, and the second high-temperature side heat exchanger is heated by the standing and traveling waves. In the thermoacoustic device described above, a heat transportation suppression means is provided which suppresses heat transportation from the first stack to the second stack side.

According to the structure described above, since heat obtained by heating at the first stack side is not transported to the second stack side, the temperature at the second stack side can be further decreased, and the heat exchange efficiency at the second stack side can be improved.

As one embodiment of the heat transportation suppression means as described above, an acoustic streaming generated in the tube is suppressed, and/or a direct-current type flow, such as convection, of a working fluid is suppressed.

In addition, as another embodiment, an acoustic wave is generated in a direction opposite to that of an acoustic streaming and/or that of a direct-current type flow, such as convection, of a working fluid.

Furthermore, by providing a resonator in the tube, an acoustic streaming and/or a direct-current type flow, such as convection, of a working fluid is suppressed.

In addition, the first stack and/or the second stack as described above is formed to have meandering or spiral communication paths.

According to the structure as described above, by the meandering or the spiral communication paths, an acoustic streaming and/or a direct-current type flow, such as convection, of a working fluid can be suppressed.

Advantages

The present invention provides a thermoacoustic device which has in a tube: a first stack provided between a first high-temperature side heat exchanger and a first low-temperature side heat exchanger; and a second stack provided between a second high-temperature side heat exchanger and a second low-temperature side heat exchanger, in which self-excited standing and traveling waves are generated by heating the first high-temperature side heat exchanger, and the second low-temperature side heat exchanger is cooled by the standing and traveling waves, or in which standing and traveling waves are generated by cooling the first low-temperature side heat exchanger, and the second high-temperature side heat exchanger is heated by the standing and traveling waves. In the thermoacoustic device described above, since a heat transportation suppression means is provided which suppresses heat transportation from the first stack to the second stack side, heat obtained by heating at the first stack side is not transported to the second stack side; hence, the temperature at the second stack side can be further decreased, and the heat exchange efficiency can be improved.

BEST MODE FOR CARRYING OUT THE INVENTION

Hereinafter, a first embodiment of a thermoacoustic device 1 according to the present invention will be described with reference to figures.

As shown in FIG. 1, the thermoacoustic device 1 of this embodiment includes a loop tube 2 having an approximately rectangular shape as a whole, and in this loop tube 2, there are provided a first heat exchanger 300, which is composed of a first high-temperature side heat exchanger 4, a first low-temperature side heat exchanger 5, and a first stack 3a, and a second heat exchanger 310, which is composed of a second high-temperature side heat exchanger 6, a second low-temperature side heat exchanger 7, and a second stack 3b. By heating the first high-temperature side heat exchanger 4 at the first heat exchanger 300 side, self-excited standing and traveling waves are generated, and when acoustic energy by the standing and traveling waves is transported to the second heat exchanger 310 side, it is converted to thermal energy at the second heat exchanger 310 side so as to cool the second low-temperature side heat exchanger 7.

In addition, in this embodiment, a heat transportation suppression means 80 is provided in order to prevent heat obtained by heating in the firsts heat exchanger 300 from being transported to the second heat exchanger 310 side along an acoustic streaming and/or a direct-current type flow, such as convention, of a working fluid in the loop tube 2, and by this means, it is attempted to enhance a cooling effect of the second low-temperature side heat exchanger 7 provided at the second heat exchanger 310 side. Hereinafter, a particular structure of this thermoacoustic device 1 will be described in detail.

The loop tube 2 forming the thermoacoustic device 1 is formed of a pair of straight tube portions 2a and connection tube portions 2b connecting therebetween so as to form a closed curved line. Those straight tube portions 2a and the connection tube portions 2b are formed of metal pipes; however, a material is not limited to a metal, and for example, a transparent glass or resin may also be used. When a transparent glass or resin is used, in an experiment or the like, the positions of the first stack 3a and the second stack 3b can be easily confirmed, and the state in the tube can be easily observed.

In addition, in the loop tube 2, the heat transportation suppression means 80 is provided. As this heat transportation suppression means 80, since it is necessary to shut off an acoustic streaming and/or a direct-current type flow, such as convection, of a working fluid, without attenuating the transmission of standing and traveling waves generated in the loop tube 2, a thin film closing a tube path of the loop tube 2, preferably such as a piezoelectric film 81, is provided. This piezoelectric film 81 is provided between the first heat exchanger 300 and the second heat exchanger 310, and by an electrical signal supplied from the outside, this film is vibrated, so that an acoustic wave is generated to suppress an acoustic streaming, convection, and the like in the loop tube 2. The phase of the acoustic wave generated from this piezoelectric film 81 is set to be the same as the phases of the standing and traveling waves generated in the first heat exchanger 300, and when the phases thereof are set to be the same as described above, generation of a higher harmonic wave, that is, an acoustic wave having at least two wavelengths, can be suppressed.

In addition, as an another embodiment of the heat transportation suppression means 80, an acoustic wave generator 82, such as a speaker, is provided outside or inside the loop tube 2. In general, since a speaker has its own thickness, when it is provided in the loop tube 2, the transmission of an acoustic wave may be inhibited in some cases. In addition, when a speaker is provided outside the loop tube 2, a normal acoustic wave may not be input to the loop tube 2 due to reflection on an outside wall surface of the loop tube 2. Hence, when a speaker is mounted, as shown in FIG. 2, a speaker mounting space 2d is preferably provided at a corner portion of the loop tube 2 and over the first heat exchanger 300, and a speaker may be mounted in this space so as to generate an acoustic wave in a direction opposite to that of an acoustic streaming and/or that of a direct-current type flow of a working fluid, which is caused by convection. In this case, in a manner similar to that described above, the phase of the acoustic wave generated from the speaker is set to be the same as the phases of the standing and traveling waves generated in the first heat exchanger 300.

In addition, when acoustic waves having the same phase are generated in the loop tube 2, as shown in FIG. 3, a Helmholtz resonator 83 is mounted at a corner portion of the loop tube 2 and over the first heat exchanger 300. When the Helmholtz resonator 83 is mounted as described above, since a specific frequency can only be attenuated, an acoustic streaming and/or a direct-current type flow, such as convection, of a working fluid can be suppressed.

In addition, in the loop tube 2 thus formed, there are provided the first heat exchanger 300, which is composed of the first high-temperature side heat exchanger 4, the first low-temperature side heat exchanger 5, and the first stack 3a, and the second heat exchanger 310, which is composed of the second high-temperature side heat exchanger 6, the second low-temperature side heat exchanger 7, and the second stack 3b.

The first high-temperature side heat exchanger 4 and the first low-temperature side heat exchanger 5 are both formed, for example, of a metal having a large heat capacity, and as shown in FIG. 5, communication paths 30 having a small diameter are provided inside each of the heat exchangers along the axial direction of the loop tube 2. Of the heat exchangers 4 and 5, the first high-temperature side heat exchanger 4 is mounted so as to be in contact with an upper surface of the stack 3a and is heated, for example, to approximately 600° C. by an electric power supplied from the outside. Alternatively, besides the electric power, this first high-temperature side heat exchanger 4 may be heated by waste heat or unused energy.

In addition, as is the case described above, the first low-temperature side heat exchanger 5 is mounted so as to be in contact with a lower surface of the first stack 3a and is set to a temperature, such as 15 to 16° C., which is relatively lower than that of the first high-temperature side heat exchanger 4, by circulating water or the like in an outer peripheral portion of the first low-temperature side heat exchanger 5.

The first stack 3a provided between the first high-temperature side heat exchanger 4 and the first low-temperature side heat exchanger 5 has a cylindrical shape in contact with the inside wall surface of the loop tube 2 and, as shown in FIG. 5, is formed of stack constituent elements 3eL and 3eH which are laminated together and which have different thermal conductivities. Those stack constituent elements 3eL and 3eH are formed using a material, such as a ceramic, a sintered metal, a metal mesh, or a metal nonwoven cloth, and the stack constituent element 3eL having a low thermal conductivity, the stack constituent element 3eH having a high thermal conductivity, and the stack constituent element 3eL having a low thermal conductivity are disposed in that order from the first high-temperature side heat exchanger 4 side. Of the stack constituent elements 3eL and 3eH, the stack constituent element 3eH having a High thermal conductivity is formed thicker than the stack constituent element 3eL having a relatively low thermal conductivity, and by the structure described above, an area in which heat exchange can be performed with a working fluid is increased. Inside those stack constituent elements 3eL and 3eH, spiral communication paths 30 having a small diameter are provided, as shown in FIGS. 4 and 5. When the communication paths 30 are each formed to have a spiral shape, an acoustic streaming and/or a direct-current type flow, such as convection, of a working fluid, which is circulated in the loop tube 2, can be suppressed. Besides the spiral shape, as the shape of the communication path 30, a meandering path filled with small spheres may also be used. Even when the meandering shape is used, a direct-current type flow of a working fluid can be suppressed. Those stack constituent elements 3eL and 3eH are laminated together in the top and down direction so as to be closely in contact with each other. By the lamination as described above, contact areas between the communication paths 30 and a working fluid are increased so as to improve the heat exchange efficiency with the working fluid.

In addition, the stack constituent elements 3eL and 3eH are each formed, for example, from a single material so as to obtain a constant thermal conductivity in a plane surface direction. When the thermal conductivity is nonuniform in a plane surface direction, the difference in temperature between the inside and the outside of the first stack 3a is generated, and thereby a nonuniform acoustic wave is generated; hence, the time for generating standing and traveling waves is delayed, and as a result, the heat exchange efficiency is degraded. Hence, the stack constituent elements 3eL and 3eH are each formed of a single material so as to obtain a constant thermal conductivity in a plane surface direction.

In addition, the first heat exchanger 300 formed of the first high-temperature side heat exchanger 4, the first low-temperature side heat exchanger 5, and the first stack 3a, as described above, is provided in the straight tube portion 2a at a position lower than the center thereof while the first high-temperature side heat exchanger 4 is disposed at an upper side. The reason the first stack 3a is provided at the position lower than the center of the straight tube portion 2a is that an acoustic wave is rapidly generated using an ascending air current which is generated when the first high-temperature side heat exchanger 4 is heated, and the reason the first high-temperature side heat exchanger 4 is provided at the upper side is that a large temperature gradient is formed from the first low-temperature side heat exchanger 5 by preventing a warm working fluid, which is generated when the first high-temperature side heat exchanger 4 is heated, from entering the communication paths 30 of the first stack 3a.

Next, operation of the first heat exchanger 300 thus formed will be described. First, when the first high-temperature side heat exchanger 4 of the first heat exchanger 300 is heated while the first low-temperature side heat exchanger 5 is cooled, heat is transported in the directions (axial direction) from the first high-temperature side heat exchanger 4 to the first low-temperature side heat exchanger 5. At this stage, heat at a temperature of approximately 600° C. obtained by heating in the first high-temperature side heat exchanger 4 is transported to the first low-temperature side heat exchanger 5 via the first stack 3a; however, the heat transportation described above is inhibited by the stack constituent elements 3eL having a low thermal conductivity, which are provided at end portions of the first stack 3a. Hence, the heat is not transported to the first low-temperature side heat exchanger 5, and as a result, the difference in temperature between the first high-temperature side heat exchanger 4 and the first low-temperature side heat exchanger 5 can be increased. In addition, the heat at a temperature of approximately 600° C. obtained by heating in the first high-temperature side heat exchanger 4 is transported to the first low-temperature side heat exchanger 5 side via a working fluid present in the communication paths 30 of the first stack 3a. As a result, the temperature gradient between the first high-temperature side heat exchanger 4 and the first low-temperature side heat exchanger 5 is formed, and by this temperature gradient generated in this working fluid, wobbling thereof is generated, so that an acoustic wave is generated while heat exchange is performed with the first stack 3a. At this stage, since large heat exchange is performed with the stack constituent element 3eH having a relatively high thermal conductivity, an acoustic wave is rapidly generated, and as a result, the heat exchange efficiency can be improved.

The acoustic wave thus generated is transmitted to the second heat exchanger 310 side as acoustic energy by the standing and traveling waves, and at this stage, an acoustic streaming and/or a direct-current type flow, such as convection, of a working fluid is suppressed by the heat transportation suppression means 80.

This second heat exchanger 310 is formed of the second high-temperature side heat exchanger 6, the second low-temperature side heat exchanger 7, and the second stack 3b. The second high-temperature side heat exchanger 6 and the second low-temperature side heat exchanger 7 are both formed, for example, of a metal having a large heat capacity and are provided at two ends of the second stack 3b, as is the case of the first stack 3a, and in addition, inside the heat exchangers 6 and 7, there are provided communication paths 30 having a small diameter through which the standing and traveling waves are allowed to pass. This second high-temperature side heat exchanger 6 is set to a temperature, such as 15 to 16° C., by circulating water in an outer peripheral portion of the second high-temperature side heat exchanger 6. On the other hand, the second low-temperature side heat exchanger 7 has a heat output portion and is designed to cool an exterior object to be cooled. As the object to be cooled, for example, ambient air, a home electric appliance which generates heat, and a CPU of a personal computer may be mentioned. In addition, the second stack 3b has the structure similar to that of the first stack 3a. That is, three layers, a stack constituent element 3eL having a low thermal conductivity, a stack constituent element 3eH having a high thermal conductivity, and a stack constituent element 3eL having a low thermal conductivity, are provided in that order from the second high-temperature side heat exchanger 6 side. In addition, the stack constituent element 3eL having a high thermal conductivity is formed thicker than the stack constituent element 3eL having a relatively low thermal conductivity. The second heat exchanger 310 formed as described above is provided in the vicinity of a position in the loop tube 2 at which the phase of change in acoustic particle velocity is the same as the phase of change in sound pressure, as shown in FIG. 7.

Inside this loop tube 2, an inert gas, such as helium or argon, is sealed. Besides the inert gases as mentioned above, a working fluid, such as nitrogen or air, may also be sealed. The pressure of the working fluid is set in the range of 0.01 to 5 MPa.

In the case in which the working fluid as described above is sealed, when helium or the like, having a small Prandtl number and also having a small specific gravity, is used, the time for generating an acoustic wave can be decreased. However, when the working fluid as described above is used, the acoustic velocity is increased, and as a result, heat exchange with stack inside walls cannot be well performed. On the other hand, when argon or the like, having a large Prandtl number and also having a large specific gravity, is used, since the viscosity is increased this time, and as a result, an acoustic wave cannot be rapidly generated. Hence, a mixed gas of helium and argon is preferably used. The mixed gas mentioned above is sealed as described below.

First, helium having a small Prandtl number and also having a small specific gravity is sealed in the loop tube 2, so that an acoustic wave is rapidly generated. Subsequently, in order to decrease the acoustic velocity of the generated acoustic wave, a gas, such as argon, having a large Prandtl number and also having a large specific gravity is injected. When this argon is mixed, as shown in FIG. 1, a helium gas injection device 9a and an argon gas injection device 9b are provided at a central portion of the connection tube portion 2b formed at an upper side, and argon is injected therefrom. Accordingly, argon equally flows into the right-side and the left-side straight tube portions 2a and are then mixed with helium present inside. The pressure of the mixed gas described above is set in the range of 0.01 to 5 MPa.

Next, an operation state of the thermoacoustic device 1 thus configured will be described.

First, helium is sealed in the loop tube 2 using the helium gas injection device 9a, and in this state, water is circulated in an outer peripheral portion of the first low-temperature side heat exchanger 5 of the first heat exchanger 300 and that of the second high-temperature side heat exchanger 6 of the second heat exchanger 310. In the above state, the first high-temperature side heat exchanger 4 of the first heat exchanger 300 is heated to approximately 600° C., and in addition, the first low-temperature side heat exchanger 5 is set to approximately 15 to 16° C. As a result, heat is transported from the first high-temperature side heat exchanger 4 to the first low-temperature side heat exchanger 5. At this stage, the heat from the first high-temperature side heat exchanger 4 is transported to the first low-temperature side heat exchanger 5 via a member of the first stack 3a; however, this heat transportation is inhibited by the presence of the stack constituent elements 3eL having a low thermal conductivity. Hence, the difference in temperature between the first high-temperature side heat exchanger 4 and the first low-temperature side heat exchanger 5 can be increased. On the other hand, the heat (600° C.) of this first high-temperature side heat exchanger 4 is transported to the first low-temperature side heat exchanger 5 side by the working fluid present in the communication paths 30 of the first stack 3a. Accordingly, the temperature gradient is formed between the first high-temperature side heat exchanger 4 and the first low-temperature side heat exchanger 5, and by this temperature gradient generated in this working fluid, wobbling thereof is generated, so that an acoustic wave is generated while heat exchange is performed with the first stack 3a. At this stage, large heat exchange is performed with the stack constituent element 3eH which is relatively thick and which has a high thermal conductivity, and the acoustic wave is rapidly generated, so that the heat exchange efficiency is improved. The acoustic wave thus generated is transported as acoustic energy by the standing and traveling waves to the second heat exchanger 310 side. This acoustic energy is transported based on the energy conservation law in a direction opposite to that of transportation of the thermal energy in the first heat exchanger 300 (from the first high-temperature side heat exchanger 4 to the first low-temperature side heat exchanger 5), that is, in a direction from the first low-temperature side heat exchanger 5 to the first high-temperature side heat exchanger 4.

Subsequently, an electrical signal is applied to the piezoelectric film 81, and by an acoustic wave generated thereby and the film itself, an acoustic streaming and/or a direct-current type flow, such as convection, of a working fluid is inhibited, and an acoustic wave which transmits in the loop tube 2 is allowed to pass therethrough.

Subsequently, immediately after the standing and traveling waves are generated, argon is injected from the argon gas injection device 9b provided at the upper side of the connection tube portion 2b so that the pressure is set at a predetermined value, thereby improving the heat exchange efficiency.

Next, at the second heat exchanger 310 side, based on the standing and traveling waves, the working fluid in the communication paths 30 of the second stack 3b is expanded and contracted. Thermal energy which is heat-exchanged at this stage is transported in a direction opposite to the transportation direction of the acoustic energy, that is, in a direction from the second low-temperature side heat exchanger 7 to the second high-temperature side heat exchanger 6 side. At this stage, high heat is accumulated at the second high-temperature side heat exchanger 6 side, and low heat is accumulated at the second low-temperature side heat exchanger 7 side. Subsequently, by the difference in temperature described above, the high heat is transported to the second low-temperature side heat exchanger 7 side via the second stack 3b; however, since the stack constituent elements 3eL having a low thermal conductivity are provided at the second high-temperature side heat exchanger 6 and the second low-temperature side heat exchanger 7 sides, the heat transportation is inhibited. Accordingly, the temperature of the second low-temperature side heat exchanger 7 can be further decreased, and hence an object to be cooled can be further cooled.

According to the embodiment described above, in the thermoacoustic device 1 which has in the loop tube 2: the first stack 3a provided between the first high-temperature side heat exchanger 4 and the first low-temperature side heat exchanger 5; and the second stack 3b provided between the second high-temperature side heat exchanger 6 and the second low-temperature side heat exchanger 7, self-excited standing and traveling waves are generated by heating the first high-temperature side heat exchanger 4, and the second low-temperature side heat exchanger 7 is cooled by the standing and traveling waves. In this thermoacoustic device 1 described above, since the heat transportation suppression means 80 is provided for suppressing the heat transportation from the first stack 3a to the second stack 3b side, the heat at a temperature of approximately 600° C. obtained by heating at the first stack 3a side is not transported to the second stack 3b side, and the temperature at the second stack 3b side can be further decreased, so that the heat exchange efficiency can be improved.

In addition, when the heat transportation is suppressed as described above, for example, since the piezoelectric film 81, the speaker 82, or the Helmholtz resonator 83 is provided so as to suppress an acoustic streaming and/or a direct-current type flow, such as convection, of a working fluid, compared to the case in which a thick member having a low thermal conductivity is provided for blocking the heat transportation, the standing and traveling waves are not adversely influenced.

In addition, as a method for suppressing an acoustic streaming and/or a direct-current type flow, such as convection, of a working fluid, since the first stack 3a and the second stack 3b, having the meandering communication paths 30 or the spiral communication paths 30, are used, an acoustic streaming and/or a direct-current type flow of a working fluid can be suppressed by the meandering communication paths 30 or the spiral communication paths 30.

The present invention is not limited to the above embodiment, and various embodiments may be performed without departing from the spirit and the scope of the present invention.

For example, in the above embodiment, although the piezoelectric film 81 or the like, which is used as the heat transportation suppression means 80, is provided between the first heat exchanger 300 and the second heat exchanger 310, besides the above case, the heat transportation suppression means 80 similar to that described above may also be provided between the second heat exchanger 310 and the first heat exchanger 300, which is a position located at a lower side of the loop tube 2.

In addition, as another embodiment of the piezoelectric film 81 of the above embodiment, a simple thin film may also be provided.

Furthermore, in the above embodiment, as the heat transportation suppression means 80, various examples of the means for suppressing an acoustic streaming and/or a direct-current type flow, such as convection, of a working fluid have been described, and besides the above examples, for example, a heat insulating member may be provided on the upper surface of the first high-temperature side heat exchanger 4 so as to prevent heat from being transported to the second heat exchanger 310 side. In this case, as is the case described above, it is also necessary to provide the communication paths having a small diameter in the insulating member for forming the communication paths 30.

In addition, as another embodiment of the heat transportation suppression means 80, in order to suppress an acoustic streaming and/or a direct-current type flow, such as convection, of a working fluid, a wind-force control means such as a fan may also be provided. However, in this case, when the wind force is excessively strong, heat is transported in a direction opposite to that of an acoustic streaming or a convection flow, and hence a control means for stopping the above flow is preferably provided.

Furthermore, in the above embodiment, the thermoacoustic device 1 in which the second stack 3b side is cooled by heating the first stack 3a side is described by way of example; however, in a manner opposite thereto, by cooling the first stack 3a side, the second stack 3b side may be heated. An example of this thermoacoustic device 1 is shown in FIG. 8.

In FIG. 8, the same reference numerals as in the above embodiment indicate elements having the same structures as described above. A thermoacoustic device 1b of this embodiment has the first heat exchanger 300 and the second heat exchanger 310, as is the first embodiment. In addition, in this embodiment, the first low-temperature side heat exchanger 5 is cooled to minus several tens of degrees or less, and at the same time, a nonfreezing solution is circulated in the first high-temperature side heat exchanger 4 and the second low-temperature side heat exchanger 7. As a result, by the law of the thermoacoustic effect, a self-excited acoustic wave is generated by the temperature gradient formed in the first stack 3a. Acoustic energy of the standing and traveling waves is generated in a direction opposite to the transportation direction (direction from the first high-temperature side heat exchanger 4 to the first low-temperature side heat exchanger 5) of thermal energy in the first stack 3a. The acoustic energy by the standing and traveling waves is transmitted to the second stack 3b side, and at the second stack 3b side, a working fluid is repeatedly expanded and contracted by the pressure change and the volume change thereof based on the standing and traveling waves. Subsequently, thermal energy generated at this stage is transported in a direction from the second low-temperature side heat exchanger 7 to the second high-temperature side heat exchanger 6 side, that is, in a direction opposite to the transportation direction of the acoustic energy. As described above, the second high-temperature side heat exchanger 6 is heated.

REFERENCE NUMERALS

Figure 1:
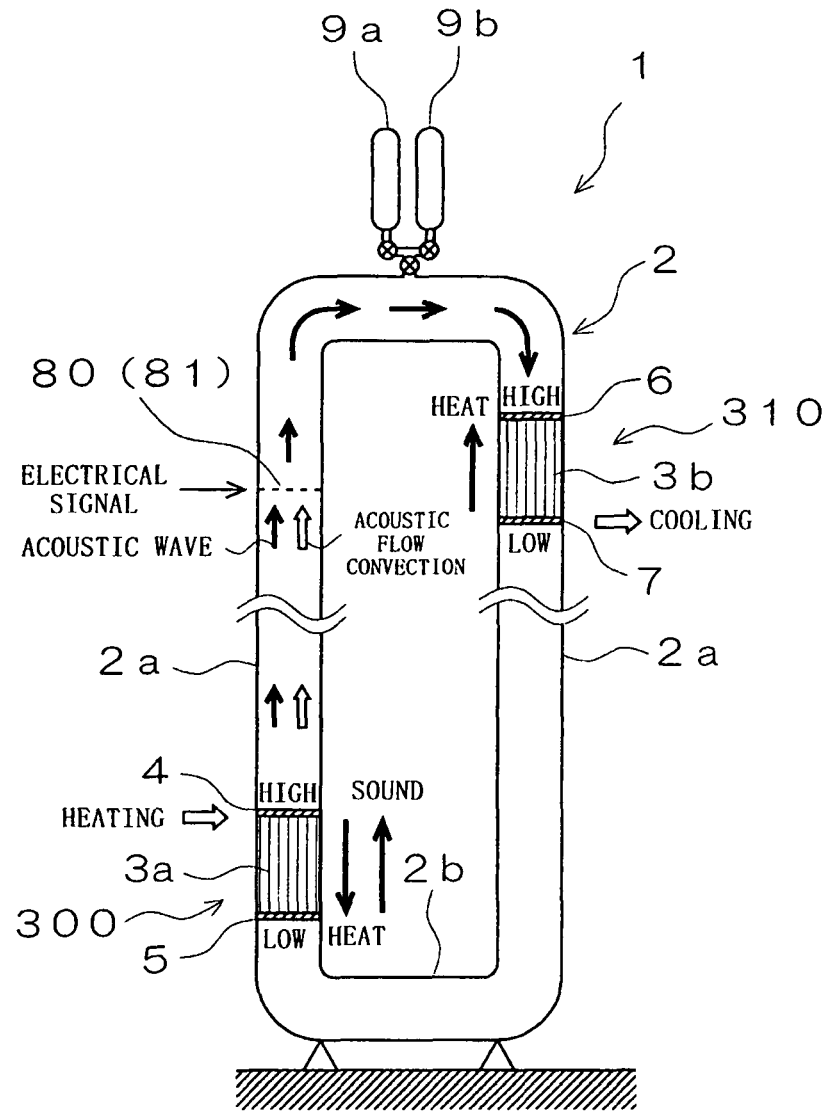
FIG. 1 is a schematic view of a thermoacoustic device showing one embodiment according to the present invention.
Figure 2:
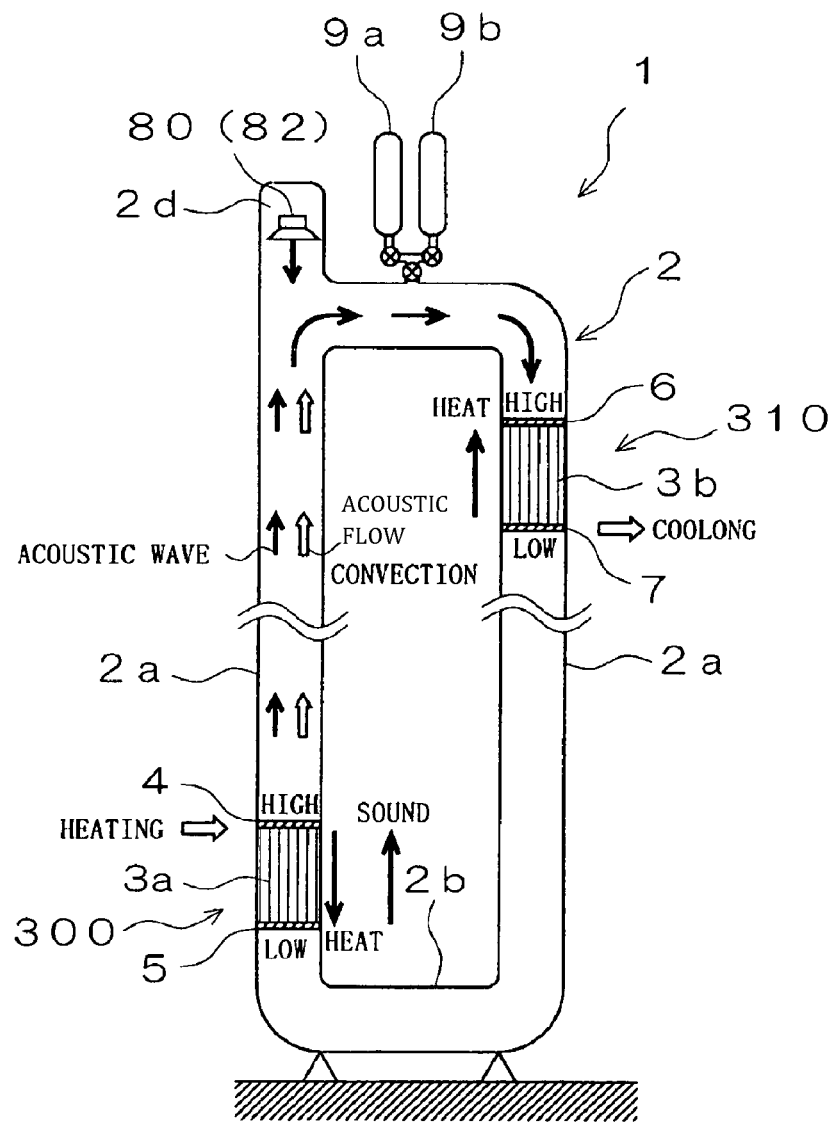
FIG. 2 is a schematic view of a thermoacoustic showing another embodiment according to the present invention.
Figure 3:
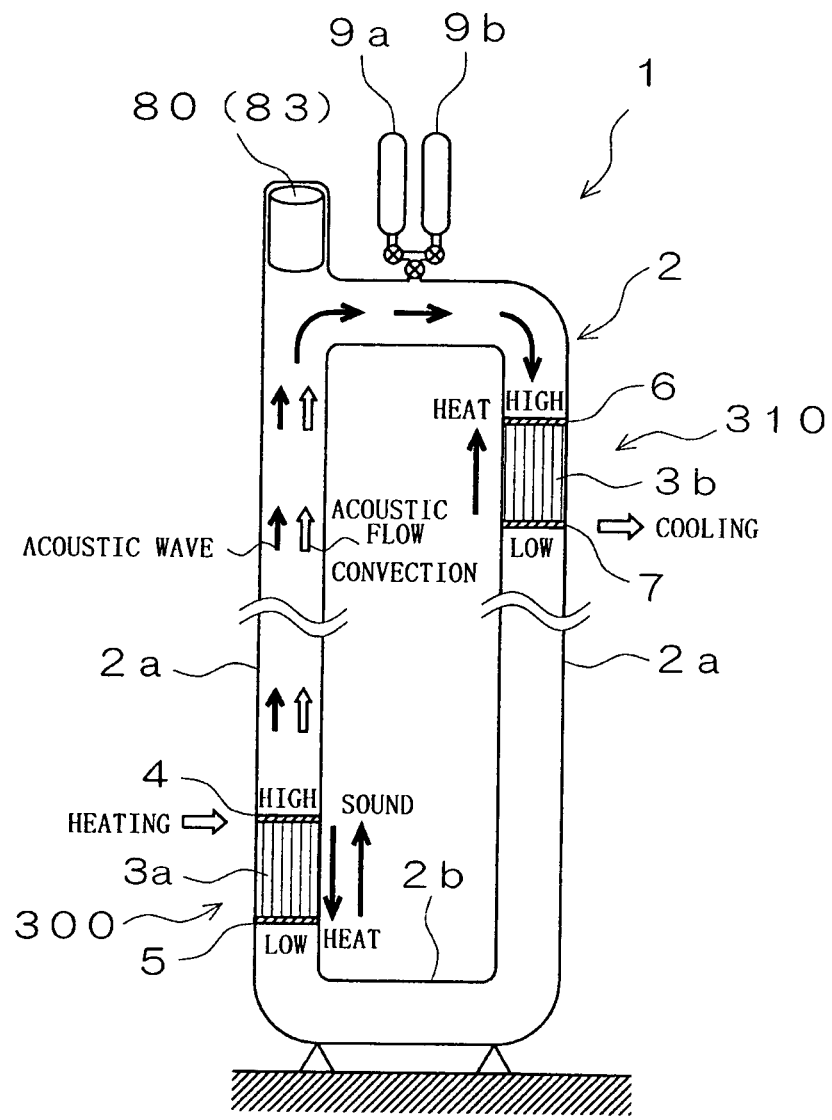
FIG. 3 is a schematic view of a thermoacoustic showing another embodiment according to the present invention.
Figure 4:
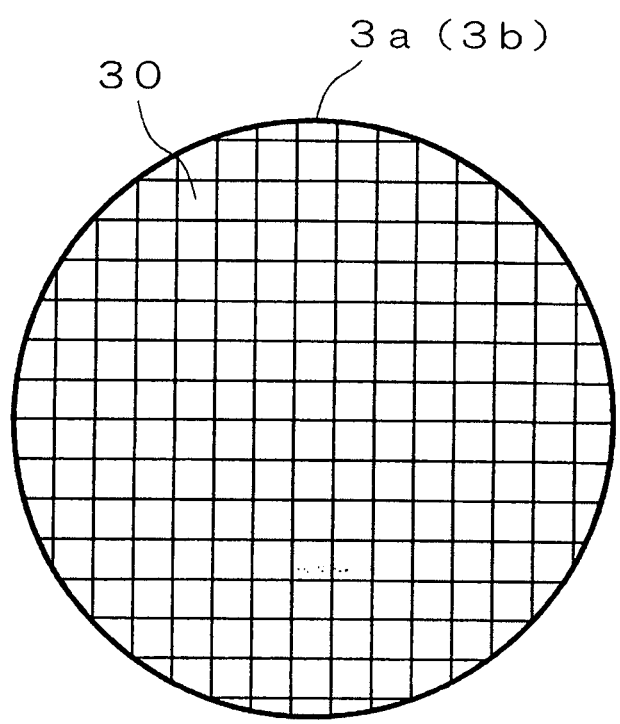
FIG. 4 is a view of a stack of the above embodiment, when viewed along an axial direction.
Figure 5:
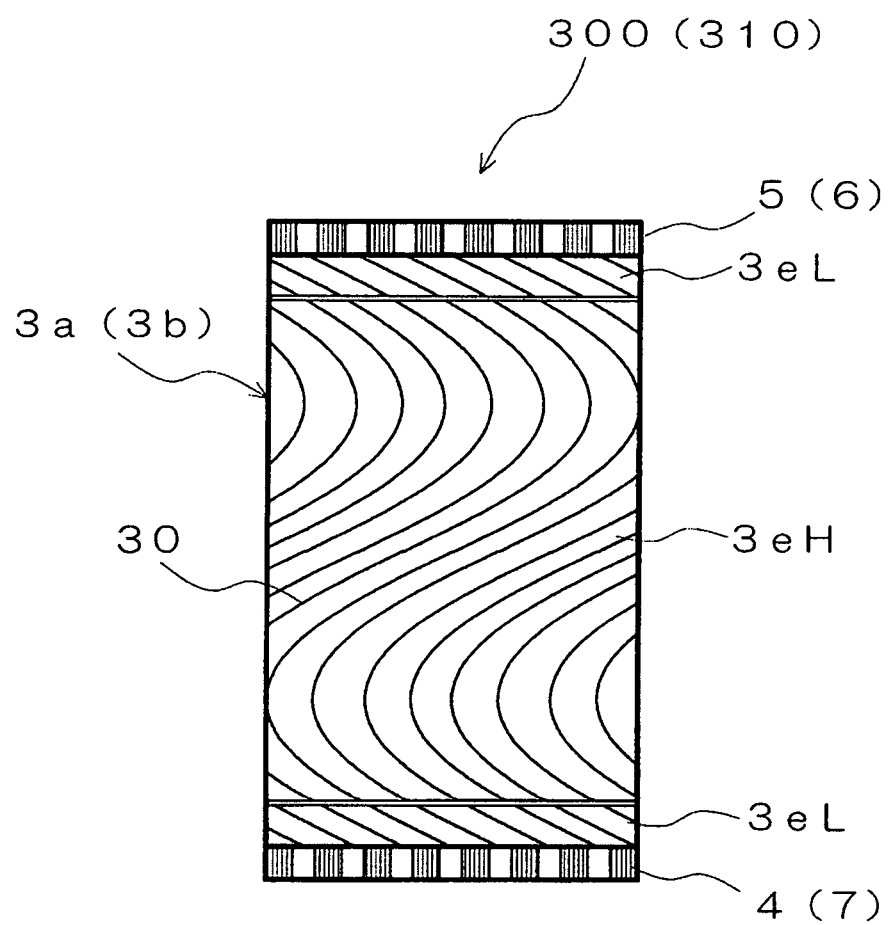
FIG. 5 is a cross-sectional view of the stack according to the above embodiment.
Figure 6:
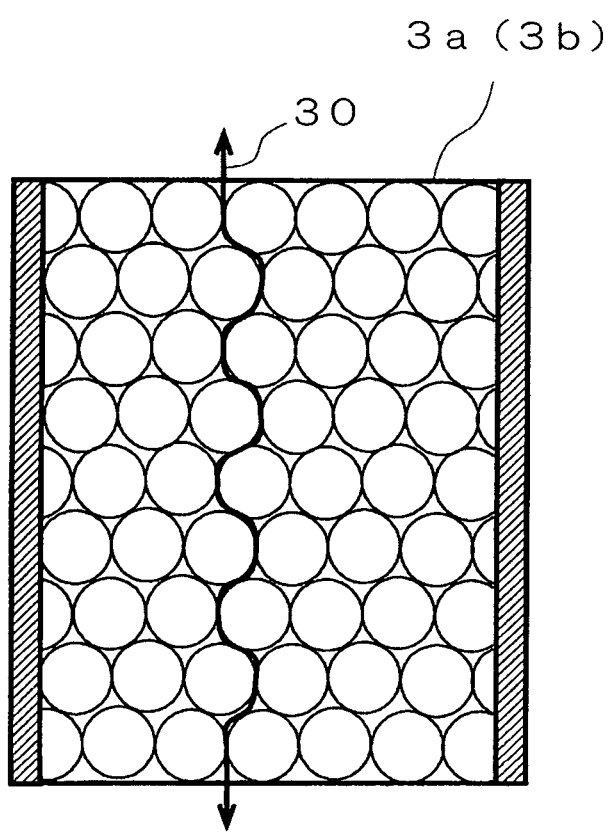
FIG. 6 is a schematic cross-sectional view of a stack according to another embodiment.
Figure 7:
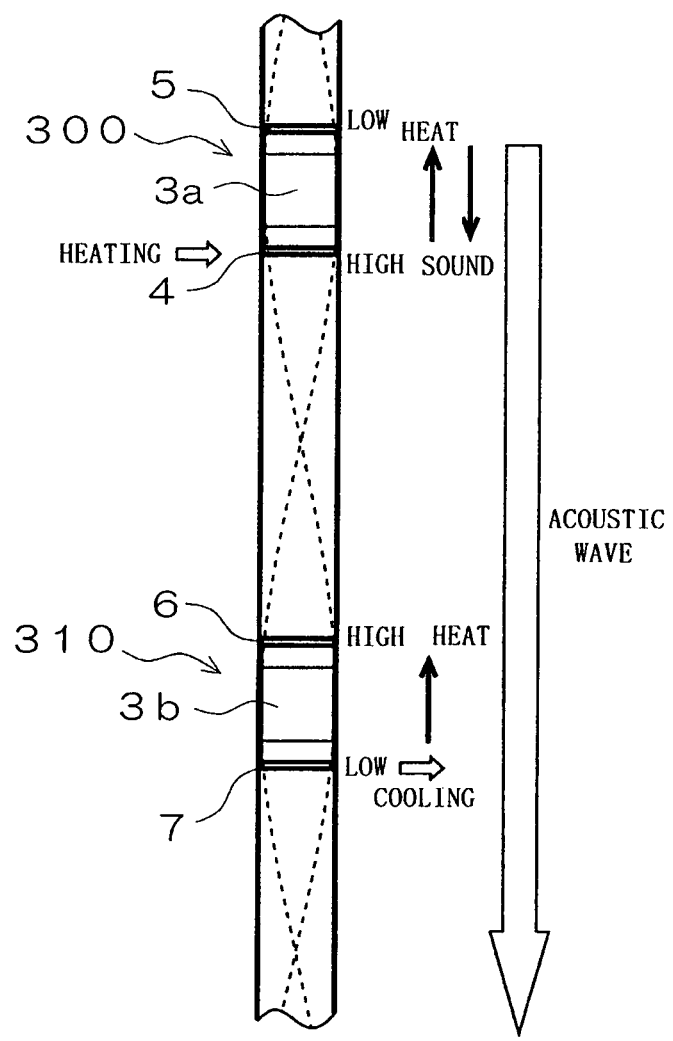
FIG. 7 is a view showing the positional relationship of an acoustic wave with a first heat exchanger and a second heat exchanger, according to the above embodiment.
Figure 8:
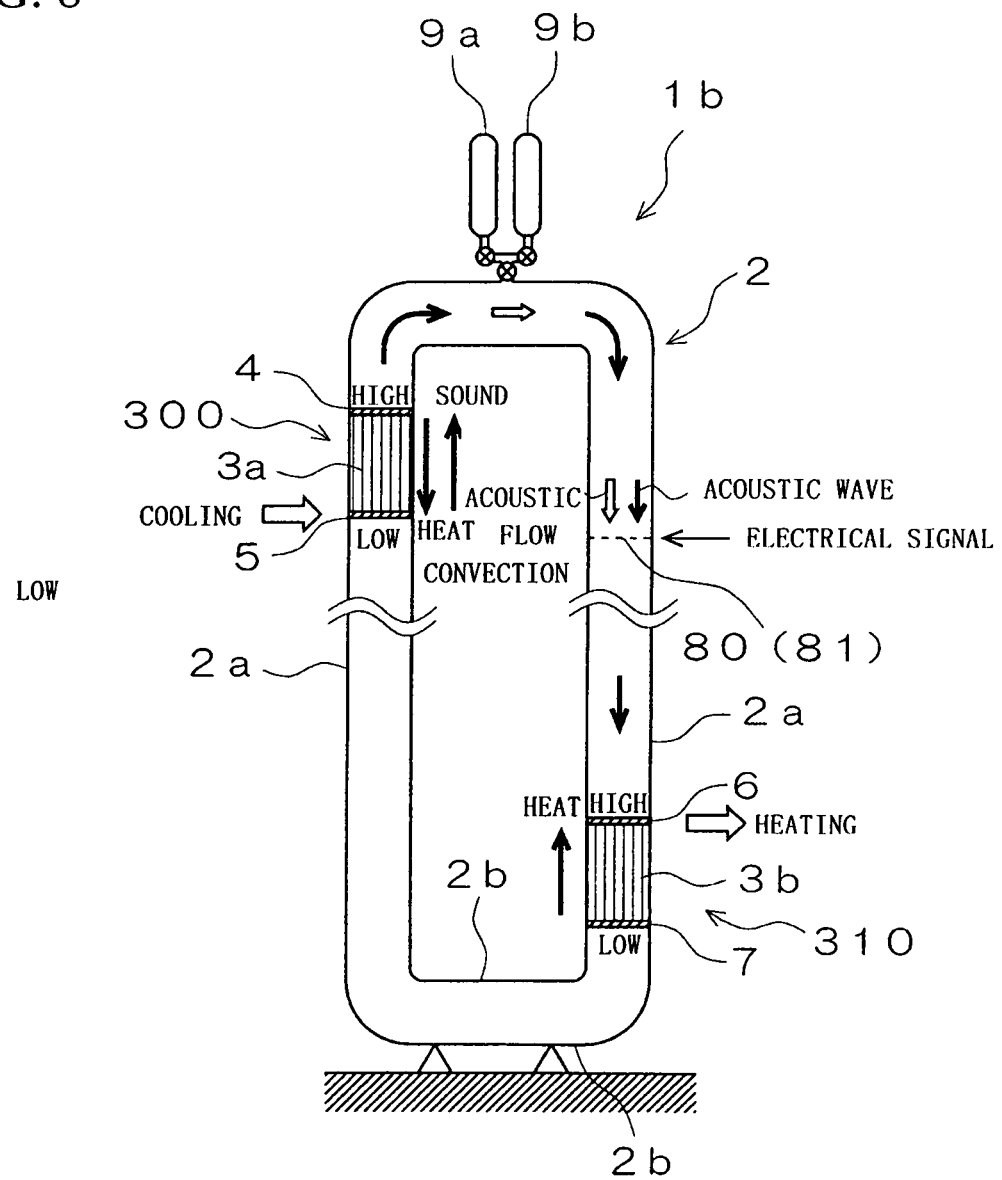
FIG. 8 is schematic view of a thermoacoustic device according to another embodiment.

1 . . . thermoacoustic device
2 . . . loop tube
2a . . . straight tube portion
2b . . . connection tube portion
3a . . . first stack
3b . . . second stack
30 . . . communication path
4 . . . first high-temperature side heat exchanger
5 . . . first low-temperature side heat exchanger
6 . . . second high-temperature side heat exchanger
7 . . . second low-temperature side heat exchanger
80 . . . thermal transportation suppression means
81 . . . piezoelectric film
82 . . . acoustic wave generator (speaker)
83 . . . resonance device
300 . . . first heat exchanger
310 . . . second heat exchanger

The invention claimed is:

1. A thermoacoustic device comprising:
a loop tube having a loop;
a first stack provided between a first high-temperature side heat exchanger and a first low-temperature side heat exchanger; and
a second stack provided between a second high-temperature side heat exchanger and a second low-temperature side heat exchanger, in which self-excited standing and traveling waves are generated by heating the first high-temperature side heat exchanger, and the second low-temperature side heat exchanger is cooled by the standing and traveling waves, or in which standing and traveling waves are generated by cooling the first low-temperature side heat exchanger, and the second high-temperature side heat exchanger is heated by the standing and traveling waves,
wherein a piezoelectric film is provided in the loop tube to close the loop tube such that the piezoelectric film shuts off a direct-current flow of a working fluid in the loop of the loop tube and that the piezoelectric film is vibrated to suppress heat transportation from the first stack to the second stack,
wherein a phase of an acoustic wave generated from the piezoelectric film is set to be the same as a phase of the standing and traveling waves to suppress generation of a harmonic wave.

2. The thermoacoustic device according to claim 1, wherein the piezoelectric film suppresses an acoustic streaming and/or a direct-current flow of a working fluid, which is generated in the tube.

* * * * *